United States Patent [19]

Nayler

[11] 4,449,854

[45] May 22, 1984

[54] MOTION COMPENSATOR SYSTEM

[75] Inventor: Douglas W. J. Nayler, Kingwood, Tex.

[73] Assignee: NL Industries, Inc., New York, N.Y.

[21] Appl. No.: 233,832

[22] Filed: Feb. 12, 1981

[51] Int. Cl.[3] ........................ E02D 21/00; E21B 7/128; E21B 19/09; F16F 9/18

[52] U.S. Cl. ........................................ 405/195; 175/7; 166/355; 267/124; 114/264

[58] Field of Search ........................ 405/195; 175/5, 7; 254/392, 900; 188/321.11; 267/70, 71, 72, 118, 267/124; 114/264, 265; 166/355

[56] References Cited

U.S. PATENT DOCUMENTS

| | | | |
|---|---|---|---|
| 3,714,995 | 2/1973 | Hanes et al. | 175/5 |
| 3,804,183 | 4/1974 | Duncan et al. | 175/5 |
| 3,871,622 | 3/1975 | Larralde et al. | 175/5 X |

FOREIGN PATENT DOCUMENTS

| | | | |
|---|---|---|---|
| 800900 | 7/1936 | France | 267/124 |

*Primary Examiner*—Cornelius J. Husar
*Assistant Examiner*—Nancy J. Stodola
*Attorney, Agent, or Firm*—Browning, Bushman, Zamecki & Anderson

[57] ABSTRACT

The invention pertains to motion compensators and compensator systems, particularly adapted for disposition between an offshore platform and a riser or conductor pipe. Each compensator includes a cylinder with a piston reciprocably mounted therein, the piston rod protruding from one end of the cylinder. That one end of the cylinder is directed toward and connected to either the platform or the riser pipe, with its other end being directed toward the other of those two bodies. Link rods are independently connected to the protruding part of the piston rod and extend longitudinally toward said other end of the cylinder for connection to said other of the two bodies. A compressible fluid is disposed between the piston and said other end of the cylinder to resist movement of the piston toward said other end and thereby resist movement of the platform and the riser pipe away from each other.

9 Claims, 5 Drawing Figures

FIG. 3
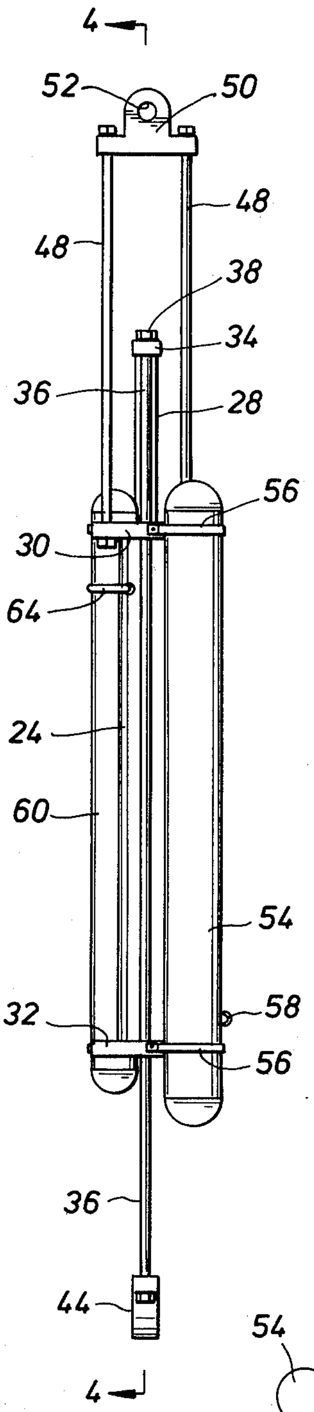
FIG. 4
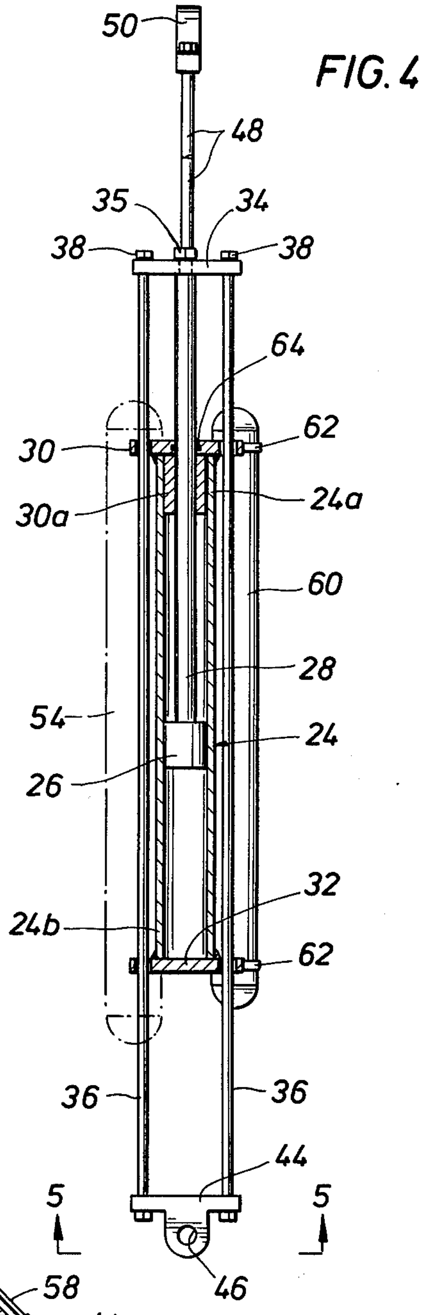
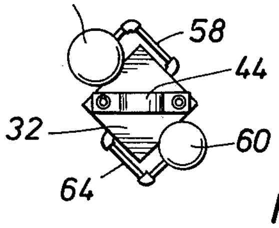
FIG. 5

MOTION COMPENSATOR SYSTEM

BACKGROUND OF THE INVENTION

The present invention pertains to a type of device commonly referred to as a "motion compensator" or "tensioner." In general, such motion compensators are employed between two relatively movable bodies or structures and compensate for the relative motion therebetween by maintaining the tension in the connecting line or lines within predetermined limits. In general, each such motion compensator includes a piston and cylinder assembly. The cylinder may be connected to one of the two relaly movable bodies or structures, while the piston is connected to the other. A cushion of pressurized air or other compressible fluid is provided at one or the other end of the cylinder as needed to resist relative movement of the piston due to increasing tension in the line or other means connecting the two bodies. Thus, as the piston moves relative to the cylinder in response to such tension, it maintains the tension in the connecting line within predetermined limits so that the line may remain sufficiently taut but without danger of breakage. In certain applications, the advantages of maintaining a relatively constant tension revolve around the ultimate objective of controlling the effective weight and/or feed rate on a drill string.

The operation of such motion compensators is more fully explained by a number of prior U.S. patents. U.S. Pat. No. 3,804,183 discloses a basic type of motion compensator and illustrates its use in interconnecting a drill string with its supporting drilling ship. U.S. Pat. No. 3,908,963 illustrates the use of such motion compensators in connecting a drilling vessel or the like with a subsurface well. U.S. Pat. No. 3,865,066 illustrates the use of such compensators in maintaining proper tension of mooring lines which connect ships to offshore platforms or the like. U.S. Pat. Nos. 3,030,893 and 3,040,667 illustrate the use of similar structures in conjunction with hydraulic pumps. U.S. Pat. Nos. 3,314,657, 4,072,122, and 3,877,680 disclose further details and/or variations of the motion compensators per se.

In some of the prior devices, such as that shown in U.S. Pat. No. 3,804,183, cited above, a relatively simple chain and sprocket arrangement is used for interconnecting the two relative movable bodies or structures via the motion compensator. However, this simple arrangement has a disadvantage in that it requires that the high pressure fluid which is used to resist increases in tension must be disposed in the rod end of the cylinder, i.e. between the piston and that end of the cylinder through which the piston rod protrudes. This in turn requires the provision of expensive, high pressure, sliding seals between the piston rod and cylinder at that end.

Other prior patents, such as U.S. Pat. No. 3,314,657, also cited above, disclose compensators arranged such that the high pressure fluid cushion is disposed in the fluid end of the cylinder, i.e. on the opposite side of the piston from the piston rod. U.S. Pat. No. 3,908,963 specifically mentions U.S. Pat. No. 3,314,657 as illustrating one type of motion compensator which can be used in connecting a vessel or the like to a subsurface well. However, devices such as illustrated in U.S. Pat. No. 3,314,657, while eliminating the need for a high pressure fluid on the rod end of the cylinder, still have some disadvantages, at least with respect to certain types of usages. Like the simpler devices described above, the device of U.S. Pat. No. 3,314,657 employs chains or other flexible members reeved about sheaves, sprockets, or the like. This makes the motion compensator relatively expensive, not only due to the use of movable parts such as the sheaves or sprockets, but also due to the need to provide the chains with sufficient strength without adversely affecting their flexibility. In addition, the type of structure shown in U.S. Pat. No. 3,314,657 ultimately employs a single common chain or set of parallel chains for connecting to both of the two relatively movable bodies or structures. Also, this type of device, while able to accommodate a relatively large degree of travel between the two bodies or structures connected thereby, necessarily sacrifices the amount of force which it can apply or withstand.

SUMMARY OF THE INVENTION

The present invention provides an improved motion compensator particularly suitable for use between structures such as offshore platforms and riser or conductor pipes, although it is also useful in other applications where relatively little travel is needed. As used herein, the term "riser type pipe structure" will refer to structures such as riser pipes and conductor pipes which extend upwardly from a wellhead to a point normally above the surface of the water. Both such riser type pipe structures and the offshore platforms typically located near them are firmly affixed to the floor of the body of water in which they are disposed. Thus, theoretically, there should be no substantial relative movement between those structures or bodies, such as would occur, for example, with a buoyant drilling ship. However, due to the necessary inherent flexibility of such platforms and pipe structures, and the action of waves, currents, etc. on them, there is in fact a certain amount of relative movement therebetween, and this movement may have both vertical and lateral components of direction.

The motion compensator of the present invention is designed and oriented such that the high pressure fluid which resists tension increase, i.e. movement of the two connected structures away from each other, is disposed in the blind end of the cylinder. This eliminates the need for a high pressure sliding seal against the piston rod. Nevertheless, the compensator of the invention does not employ chain and sheave arrangements, such as are typical of the prior art, but rather much simpler rigid structures. This not only reduces the cost of the apparatus, without sacrificing strength or effectiveness, but even increases the force capacity and general effectiveness of the apparatus.

More specifically, the cylinder is connected by first connection means, preferably extending longitudinally outwardly from its rod end, to a connection area of one of the structures, e.g. the drilling platform, toward which area said rod end of the cylinder is oriented or directed. The other end or blind end of the cylinder is directed toward a connection area on the other structure, e.g. the riser pipe, and the portion of the piston rod protruding outwardly from the cylinder is connected to this other structure by second connection means extending from said piston rod longitudinally back along the cylinder toward its blind end. Thus, if the connection area of the riser pipe should tend to move away from the connection area of the platform, thereby increasing tension in the interconnecting apparatus or "line" this will tend to move the piston toward the blind end, rather than the rod end, of the cylinder. In other words, an increase in tension will place the piston and cylinder assembly in compression, rather than tension. Accordingly, the high pressure fluid cushion can be disposed in the blind end of the cylinder, thereby eliminating the need for a high pressure sliding seal between the cylinder and the piston rod.

More particularly, unlike the chain and sheave arrangements of the prior art, the first and second connecting means mentioned above are completely independent of each other. Thus, in the unlikely event of breakage of one or the other of such connection means, the consequences are less extensive. The connection means which connects the piston rod to the riser pipe includes link means which, unlike the chains or ropes of the prior art, has a non-varying point of attachment to the piston rod, and preferably, is rigid rather than flexible. The high degree of simplicity, coupled with strength and effectiveness, of the improved connection means according to the invention will be more fully appreciated in conjunction with the following detailed description. At this point, suffice it to say that:

It is a principal object of the present invention to provide an improved motion compensator or tensioner.

Another object of the present invention is to provide such a compensator which is particularly adapted for connecting an offshore support structure to a riser type pipe structure.

Still another object of the present invention is to provide such a compensator which eliminates the need for chain and sheave or like arrangements, replacing the latter with rigid connection means having non-varying points of attachment to the respective portions of the piston and cylinder assembly.

Yet another object of the present invention is to provide such a compensator in which the connection means for the cylinder and piston respectively are independent of or separate from each other.

Still other objects, features and advantages of the present invention will be made apparent by the following detailed description of a preferred embodiment, the drawings, and the claims.

BRIEF DESCRIPTION OF THE DRAWINGS

FIG. 3 is a plan view of the compensator of FIG. 2.

FIG. 4 is a longitudinal cross-sectional view of the compensator taken along the line 4—4 in FIG. 3.

FIG. 5 is an end view along the line 5—5 of FIG. 4.

DETAILED DESCRIPTION

Figure 1:
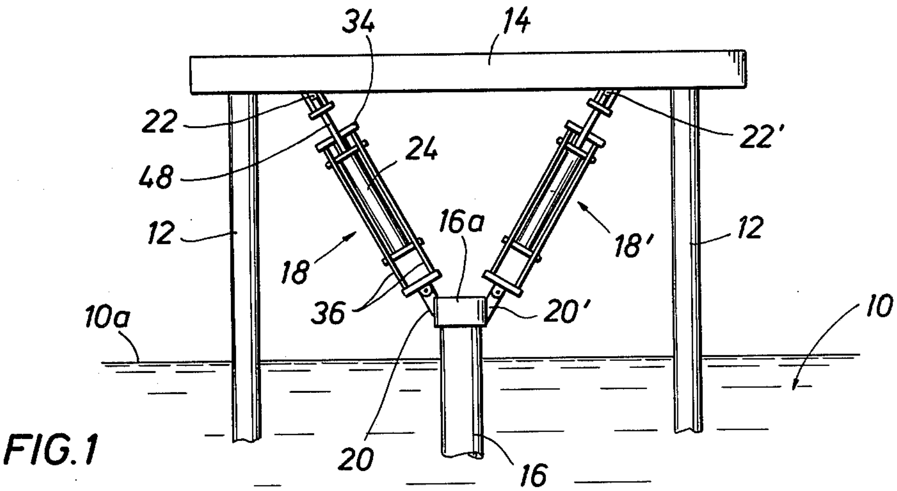
FIG. 1 is a diagrammatic environmental view of a motion compensation system according to the present invention.
Figure 2:
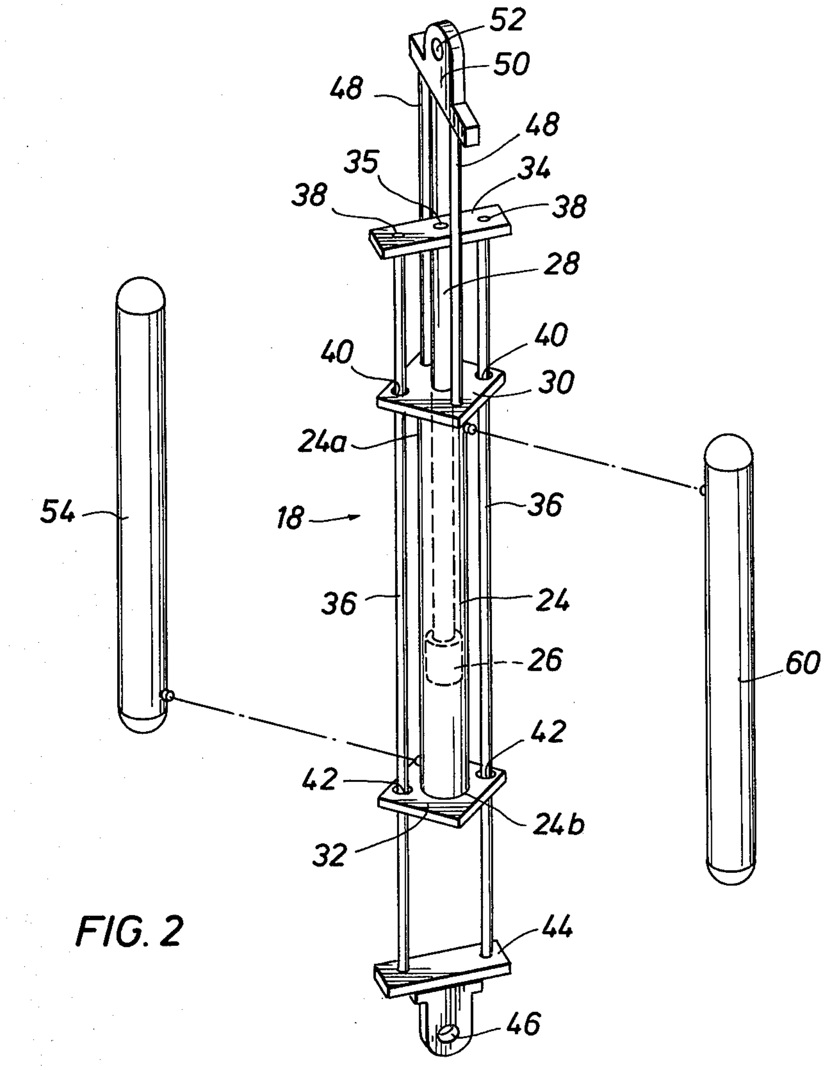
FIG. 2 is an enlarged, partially exploded, perspective view of one of the motion compensators of the system of FIG. 1.

Referring to FIG. 1, there is shown a body of water 10 the surface of which is denoted by the numeral 10*a*. Suitably supported on the bottom (not shown) of the body of water 10 is a support structure in the form of a drilling platform having legs 12 and a deck 14. FIG. 1 also shows a riser type pipe structure 16 such as a riser pipe or conductor pipe stack which is rigidly attached to and extends upwardly from a subsurface wellhead (not shown) and the upper end 16*a* of which is normally located above the water surface 10*a* but below the platform deck 14 as shown.

Although both the support structure 12, 14 and the pipe structure 16 are fixed with respect to the bottom of the body of water 10, there will still be some relatively small amount of movement between those two structures due to wave action, tides, currents, wind, etc. It is therefore desirable to interconnect the two structures by means which will compensate for such relative movement and maintain the tension in the overall connection lines or apparatus within given limits. For this purpose, a pair of motion compensators 18 and 18′, which are identical except for their positions with respect to the platform and riser pipe, are provided. As viewed in FIG. 1, the left hand side of the upper portion 16*a* of the riser type structure has a connection area 20 for connection to the motion compensator 18. A portion of the deck 14 located upwardly and laterally outwardy from pipe area 20 serves as a connection area 22 for connection of compensator 18 to the support structure. The connection areas 20′ and 22′ for compensator 18′ on the right hand side of the system are similarly oriented with respect to each other. Thus the compensators 18 and 18′ are inclined upwardly and laterally outwardly so that they may accommodate relative movements between pipe structure 16 and deck 14 having both lateral and vertical components of direction.

Referring now to FIGS. 2 through 5 in conjunction with FIG. 1, compensator 18 will be described in greater detail. Compensator 18 includes a cylinder 24 having a piston 26 reciprocably mounted therein. A piston rod 28 is adjoined to piston 26 and protrudes through the upper or rod end 24*a* of cylinder 24. A flange plate 30 is rigidly fixed to and extends laterally outwardly from the rod end 24*a* of cylinder 24. A similar flange plate 32 is rigidly fixed to and extends laterally outwardly from the opposite or blind end 24*b* of cylinder 24. As shown in FIG. 4, plates 30 and 32 actually form the closures for the ends of cylinder 24. Plate 30*a* has an integral sleeve 30*a* extending into cylinder 24 for sliding receipt of piston rod 28. In use, as shown in FIG. 1, the rod end 24*a* of cylinder 24 is directed generally toward connection area 22 of deck 14, while blind end 24*b* is directed generally toward connection area 20 of pipe structure 16.

A cross piece 34, preferably in a very simple form such as a rectangular plate as shown, is rigidly affixed to the end of piston rod 28 which protrudes from cylinder 24 by a screw 35 so that plate 34 extends laterally across the end of the piston rod. The laterally outer ends of cross piece 34 are in turn rigidly affixed to the ends of a pair of parallel link rods 36 by screws 38. The cross piece 34 and rods 36 thus form rigid link means having a non-varying point of attachment to piston rod 28, as compared to a sheave and chain arrangement wherein the point of contact with the chain may vary.

While cross piece 34 is generally located adjacent the rod end 24*a* of cylinder 24, link rods 36 extend therefrom longitudinally back along the length of cylinder 24 toward and beyond its blind end 24*b*. Link rods 36 are slidably received in respective bores 40 extending through flange plate 30 adjacent diametrically opposite corners thereof, and likewise through similar bores 32 in flange plate 42. This arrangement helps to guide and stabilize rods 36 as they reciprocate jointly with piston 26. Longitudinally outwardly of blind end 24*b* of cylinder 24, the ends of link rods 36 are joined by a connection piece 44 having an eyelet 46 for connection to the pipe structure 16. For simplicity, FIG. 1 illustrates the system with the motion compensators 18 and 18′ shown on a relatively large scale so that they are directly attached to the connection areas 20, 22, 20' and 22' by clevis and pin arrangements. However, it should be understood that, depending upon the relative sizes of the various parts of the system, etc., cross piece 44 could be connected to connection area 20 by a cable or the like, the same being true for the connection means between the cylinder and the deck 14, described hereinbelow. In any event, it should be understood that the compensator 18, along with any cables or other devices used to connect the compensator or structures 14 and 16, comprises a tension line interconnecting those structures.

Referring again to FIGS. 2–5, another connection means, independent of the means 34, 36, 44 connecting the piston rod to the pipe structure 16, is provided for connecting the cylinder to the deck 14. More specifically, a pair of extension rods 48 are rigidly affixed to plane 30 adjacent diametrically opposite corners thereof spaced 90° from the bores 40. Rods 48 extend longitudinally outwardly away from rod end 24*a* of cylinder 24, beyond cross piece 34, where the ends are rigidly joined by a cross piece 50 having an eyelet 52 for connection to connection area 22 of platform deck 14 either directly or via a cable or the like.

It can be seen that, with the motion compensator 18 connected as shown in FIG. 1 and described hereinabove, movement of connection areas 20 and 22 away from each other will tend to place the overall connecting line therebetween in tension, but will tend to urge piston 26 toward blind end 24*b* of cylinder 24, thereby placing the piston and cylinder assembly itself in compression. Accordingly, suitable tension can be maintained, while providing for telescoping movements of the piston and cylinder as needed, by disposing a pressurized compressible fluid, such as air, in the cylinder 24 between its blind end 24*b* and its piston 26. Such high pressure fluid is supplied from a tank 54 mounted on the compensator by brackets 56 or the like and communicating with cylinder 24 through a line 58. Suitable pressurizing means, valving, etc. will be provided in the manner well known in the art, and various prior patents cited hereinabove may be referred to for a more detailed discussion of the hydraulics of such compensators. The high pressure fluid in the blind end of cylinder 24 maintains a desired minimum tension in the line connecting areas 20 and 22 of the pipe and platform respectively, resisting but permitting limited movement of those areas away from each other.

As a safeguard against excessively rapid movement of piston 26, particularly in the event of an accident such as breakage of one of the fluid lines or some other part of the compensator, a low pressure fluid may be supplied to the rod end of cylinder 24, also in a manner well known in the art and described in the prior patents cited above. Briefly, this fluid may be a liquid, such as oil, urged into the cylinder by a slightly pressurized gas, such as air. A tank 60, mounted on the compensator by brackets 62, and communicating with the rod end of cylinder 24 by a line 64, provides for overflow of such air and/or oil when the piston 26 moves upwardly within its cylinder 24. The latter fluids, merely constituting a buffer, are not highly pressurized. Thus there is no continual need for a high pressure sliding seal between piston rod 28 and the adjacent cylinder head, and a simple seal, represented by the o-ring 64 in FIG. 4, may be used, the high pressure fluid in the blind end of cylinder 24 being retained by suitable conventional sealing between that cylinder and the piston 26. However, since the rod end of the cylinder may be subjected to occasional higher pressures due to abnormal conditions, e.g. rod breakage, a chevron or other type seal could be employed.

The foregoing represents only one preferred embodiment of the invention, and numerous modifications will suggest themselves to those of skill in the art. Accordingly, it is intended that the scope of the invention be limited only by the claims which follow.

I claim:

1. A motion compensation system for disposition between an offshore support structure in a body of water and a riser-type pipe structure mounted to the floor of said body of water, said structures having respective upper portions normally disposed above the surface of the water, said compensation system including a pair of motion compensators disposed generally on opposite sides of said riser-type pipe structure, each of said compensators comprising:

a cylinder having one end directed generally toward a connection area on said upper portion of one of said structures and the other end directed generally toward a connection area on said upper portion on the other of said structures;

a piston reciprocably mounted within said cylinder;

a piston rod adjoining said piston and protruding outwardly through said one end of said cylinder;

first connection means connecting said cylinder to said connection area of said one structure;

second connection means connecting the protruding part of said piston rod to said connection area of said other structure independently of said first connection means and of said cylinder;

and a compressible fluid disposed between said piston and said other end of said cylinder to resist movement of said piston toward said other end of said cylinder and thereby resist relative movement of said connection areas of said structures away from each other;

and said pair of motion compensators being angularly oriented with respect to vertical and oppositely to each other to compensate for both lateral and vertical relative movement of said structures.

2. The system of claim 1 wherein said second connection means comprises link means having a substantially non-varying point of attachment to said protruding part of said piston rod, said link means extending from said attachment point longitudinally in the direction of said other end of said cylinder for connection to said other structure.

3. The system of claim 2 wherein said link means is rigid.

4. The system of claim 1 wherein said one structure is said support structure.

5. The system of claim 4 wherein said support structure is an offshore platform.

6. A motion compensator for disposition between two relatively movable structures comprising:

a cylinder having one end directed generally toward a connection area of one of said structures and the other end directed generally toward a connection area of the other of said structures;

a piston reciprocably mounted within said cylinder;

a piston rod adjoining said piston and protruding outwardly through said one end of said cylinder;

first connection means connecting said cylinder to said connection area of said one structure;

second connection means, independent of said first connection means, and connecting the protruding part of said piston rod to said connection area of said other structure; and a compressible fluid within said cylinder between said piston and said other end of said cylinder to resist movement of said piston toward said other end of said cylinder and thereby resist relative movement of the connection areas of said structures away from each other;

wherein said second connection means comprises rigid link means having a substantially non-varying point of attachment to said protruding part of said piston rod, said link means including a cross piece rigidly affixed to and extending laterally across said protruding part of said piston rod, and a pair of parallel link rods extending longitudinally from said cross piece beyond said other end of said cylinder, and a connection piece interconnecting the ends of said link rods longitudinally outwardly of said other end of said cylinder for connection to said other structure;

and wherein said first connection means includes a pair of parallel extension rods rigidly affixed to said one end of said cylinder and extending longitudinally outwardly from said one end beyond said cross piece of said link means, said first connection means further comprising a connection piece interconnecting the ends of said extension rods longitudinally outwardly of said cross piece for connection to said one structure.

7. A motion compensator comprising:

a cylinder;

a piston reciprocably mounted within said cylinder;

a piston rod adjoining said piston and protruding outwardly through said one end of said cylinder;

first connection means connected to said cylinder;

second connection means comprising link means having a substantially non-varying point of attachment to said protruding part of said piston rod, said link means including a cross piece rigidly affixed to and extending transversely across said protruding part of said piston rod and a pair of parallel link rods extending from said cross piece longitudinally beyond said other end of said cylinder, and a second connection piece interconnecting the ends of said link rods longitudinally outwardly of said other end of said cylinder;

and wherein said first connection means includes a pair of extension rods rigidly affixed to and extending longitudinally outwardly from said one end of said cylinder beyond said cross piece, and a first connection piece interconnecting the ends of said connection rods longitudinally outwardly of said cross piece.

8. The apparatus of claim 7 wherein said connection rods are diametrically opposed to each other, and wherein said link rods are diametrically opposed to each other and circumferentially spaced from said extension rods by approximately 90 degrees.

9. The apparatus of claim 8 wherein said cylinder has a pair of flange plates each rigidly adjoining and extending laterally outwardly from a respective end of said cylinder, said extension rods being mounted on the flange plate at said one end of said cylinder, and each of said flange plates having respective bores for slidably receiving said link rods.

* * * * *